United States Patent
Taylor et al.

(10) Patent No.: US 11,536,164 B1
(45) Date of Patent: Dec. 27, 2022

(54) CLOSED-LOOP BRAYTON CYCLE SYSTEM WITH TURBINE BLADE COOLING

(71) Applicant: Hamilton Sundstrand Corporation, Charlotte, NC (US)

(72) Inventors: Stephen H. Taylor, East Hartford, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/661,462

(22) Filed: Apr. 29, 2022

(51) Int. Cl.
   *F01K 25/10* (2006.01)
   *F02C 1/10* (2006.01)
   *F01K 23/10* (2006.01)
   *F02C 1/05* (2006.01)

(52) U.S. Cl.
   CPC ............ *F01K 25/103* (2013.01); *F01K 23/10* (2013.01); *F02C 1/05* (2013.01); *F02C 1/10* (2013.01); *F05D 2260/213* (2013.01)

(58) Field of Classification Search
   CPC .......... F01K 25/103; F01K 23/10; F02C 1/05; F02C 1/10; F05D 2260/213
   USPC ............................................. 60/650, 682–684
   See application file for complete search history.

(56) References Cited

U.S. PATENT DOCUMENTS

| | | | |
|---|---|---|---|
| 4,835,979 A * | 6/1989 | Murry | F25B 9/06 62/402 |
| 9,359,919 B1 * | 6/2016 | Berry | F01K 25/103 |
| 9,926,814 B2 | 3/2018 | Roh et al. | |
| 11,187,148 B1 | 11/2021 | Macdonald et al. | |
| 11,255,223 B2 | 2/2022 | Akhtar | |
| 2011/0154822 A1 * | 6/2011 | Protz | F28F 9/026 165/104.19 |
| 2014/0060002 A1 * | 3/2014 | Sonwane | F02C 3/04 60/39.182 |
| 2014/0088773 A1 * | 3/2014 | Davidson | H02K 7/18 700/288 |
| 2021/0340878 A1 | 11/2021 | Macdonald et al. | |

* cited by examiner

*Primary Examiner* — Hoang M Nguyen
(74) *Attorney, Agent, or Firm* — Kinney & Lange, P. A.

(57) ABSTRACT

A closed-loop Brayton cycle system utilizes supercritical carbon dioxide as the working fluid for the system to achieve higher efficiencies than can be achieved with traditional open-loop gas turbine engines. A bleed channel is used to direct a flow of cooling fluid to cool the turbine blades during operation of the system, preventing damage to the turbine blades during operation of the system. The bleed channel includes a bleed inlet fluidly coupled between a first recuperator and a second recuperator and a bleed outlet fluidly coupled to the turbine blades. The bleed channel is configured to direct the flow of cooling fluid to the turbine blades at a desired temperature and pressure.

20 Claims, 5 Drawing Sheets

CLOSED-LOOP BRAYTON CYCLE SYSTEM WITH TURBINE BLADE COOLING

STATEMENT OF GOVERNMENT INTEREST

This invention was made with government support under Contract No. DE-EE0009138, Sub-Contract No. 828 awarded by The Department of Energy. The government has certain rights in the invention.

BACKGROUND

The present invention relates to closed-loop Brayton cycle systems for power generation and, more particularly, to a closed-loop Brayton cycle system with turbine blade cooling.

Improvements in power generation efficiencies are needed to comply with increasingly strict emissions regulations. Supercritical carbon dioxide cycles have the potential to enable high efficiency power generation at low capital costs. Further, supercritical carbon dioxide cycles have the potential to replace Rankine power generation cycle systems with smaller hardware in a more efficient thermodynamic cycle. Thermodynamic efficiency of fluid power cycles increases as the heat input temperature directly before turbine expansion increases. As such, supercritical carbon dioxide technologies enabling the requisite high temperatures can be used to achieve the desired high efficiencies, but the usefulness of supercritical carbon dioxide technologies is limited by the lack of turbine materials which can withstand continuous exposure to the required high temperatures.

SUMMARY

According to one aspect of the disclosure, a closed-loop Brayton cycle system is disclosed. The closed-loop Brayton cycle system includes a first compressor and a first turbine including a plurality of turbine blades, the first turbine is fluidly coupled to the first compressor. Further, each of the plurality of turbine blades include internal cooling features. The system also includes a first recuperator and a second recuperator positioned between the first compressor and the first turbine. The first recuperator and the second recuperator are fluidly coupled to the first compressor and the first turbine, and the first recuperator is fluidly coupled through a conduit to the second recuperator. Further, the system includes a bleed channel including a bleed inlet and a bleed outlet. The bleed inlet is fluidly coupled to the conduit at a location between the first recuperator and the second recuperator, and the bleed outlet is fluidly coupled to the plurality of turbine blades to direct a bleed stream of a working fluid flowing through the bleed channel into the internal cooling features of the plurality of turbine blades when the closed-loop Brayton cycle system is operating. The closed-loop Brayton cycle system is configured to flow the working fluid through the closed-loop Brayton cycle system when in operation.

According to another aspect of the disclosure, a method of operating a closed-loop Brayton cycle system is disclosed. The method includes: flowing a working fluid from a first compressor to and through a second recuperator; flowing the working fluid from the second recuperator into a conduit positioned between and fluidly coupling the second recuperator to a first recuperator; directing a first portion of the working fluid through a bleed inlet of a bleed channel and into the bleed channel; directing a second portion of the working fluid through the first recuperator and into a first turbine; and flowing the first portion of the working fluid through the bleed channel and out through a bleed outlet fluidly coupled to a plurality of turbine blades positioned within the first turbine. The first portion of the working fluid flowing into the plurality of turbine blades decreases the temperature of the plurality of turbine blades during operation of the closed-loop Brayton cycle system.

DETAILED DESCRIPTION

Figure 1:
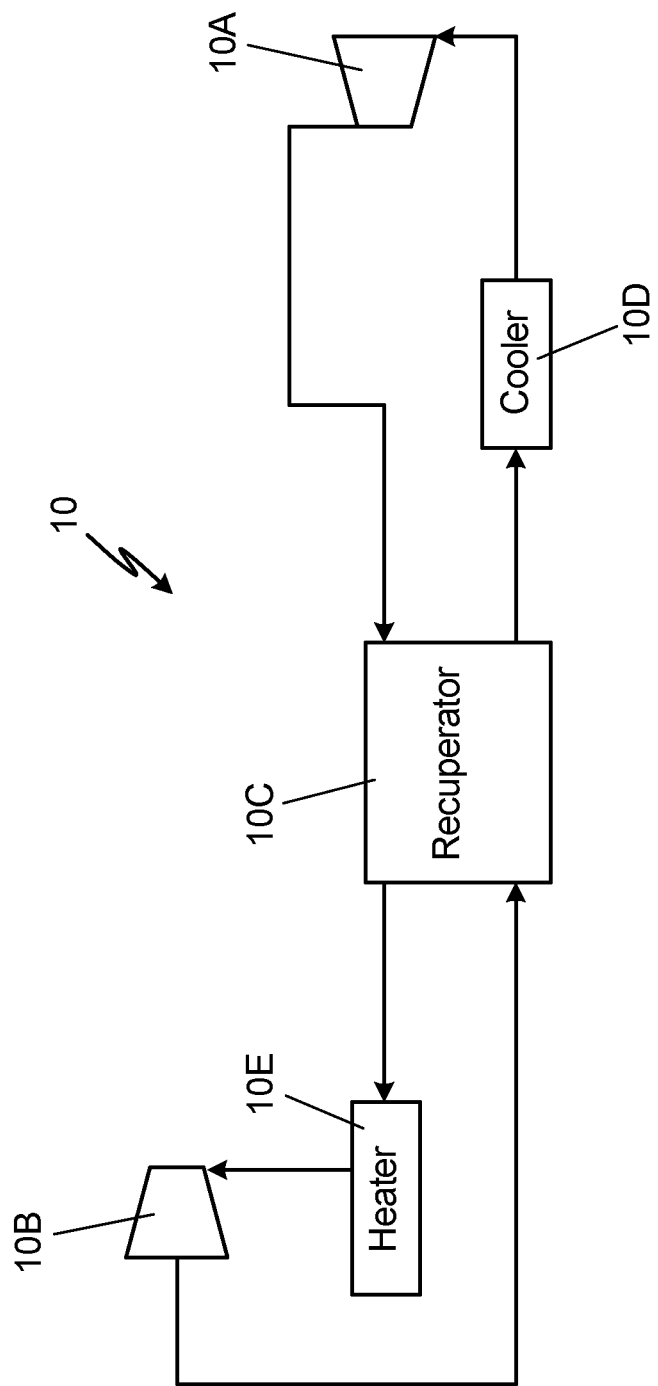
FIG. 1 is a schematic diagram illustrating a prior art closed-loop Brayton cycle system.

FIG. 1 is a schematic diagram illustrating a prior art closed-loop Brayton cycle system. The Brayton cycle is a thermodynamic cycle that describes the conversion of heat to power for the system of interest. A Brayton cycle system is used to extract energy from a flowing working fluid to generate usable work which can be used to power many different vehicles or other systems. A closed-loop Brayton cycle system is a highly efficient power cycle that recirculates the working fluid instead of expelling the working fluid as with an open or traditional air-breathing Brayton cycle system. As shown in FIG. 1, the prior art closed-loop Brayton cycle system 10 includes compressor 10A, turbine 10B, recuperator 10C, cooler 10D, and heater 10E. In operation, a working fluid flows through each component and is recirculated within system 10 to generate usable work which can be used to power many different vehicles or other systems.

More specifically, in operation, a working fluid flowing through the prior art closed-loop Brayton cycle system 10 flows through compressor 10A, where the working fluid is compressed to achieve a higher temperature and higher pressure. Power to operate compressor 10A is input through a first shaft (not shown) and may come from any available mechanical source. The working fluid flows through recuperator 10C, where heat is added to the compressed working fluid. Then the working fluid flows through heater 10E, where additional heat is added to the compressed and heated working fluid to further increase the temperature of the working fluid before it enters turbine 10B. The working fluid flows through and is expanded within turbine 10B, such that energy or work is extracted from the working fluid. Power is extracted from turbine 10B through a second shaft (not shown) and may use used for any useful purpose, including to power compressor 10A, generate electricity, or any other useful purpose. The working fluid continues by flowing through recuperator 10C, where heat is extracted from the working fluid after exiting turbine 10B. At least some of the heat that is extracted from the working fluid is subsequently transferred to the working fluid exiting compressor 10A and flowing towards turbine 10B, to increase the temperature of the flowing working fluid. The working fluid continuously recirculates through the prior art closed-loop Brayton cycle system 10 and the working fluid is heated and cooled to create work that can be used to power engines or other systems.

According to the laws of thermodynamics, thermodynamic efficiency of fluid power cycles increases as the input temperature of the working fluid entering the turbine increases.

In other words, the higher the temperature of the working fluid entering the turbine section of the system, the more efficient the fluid power cycle. Therefore, it is desirable to have high temperature working fluids entering the turbine section of the system, while also preventing melting or damage to components of the turbine section. Prior art closed-loop Brayton cycle systems, as shown in FIG. 1, are limited in the efficiencies that can be achieved by the material properties of the turbine section. The temperature of the working fluid flowing into the turbine section can only be raised to a maximum temperature limit before the high temperatures of the working fluid will begin melting or damaging the turbine section. As such, a closed-loop Brayton cycle system that can withstand extreme temperatures is required to achieve higher efficiency fluid power cycle systems.

Figure 2:
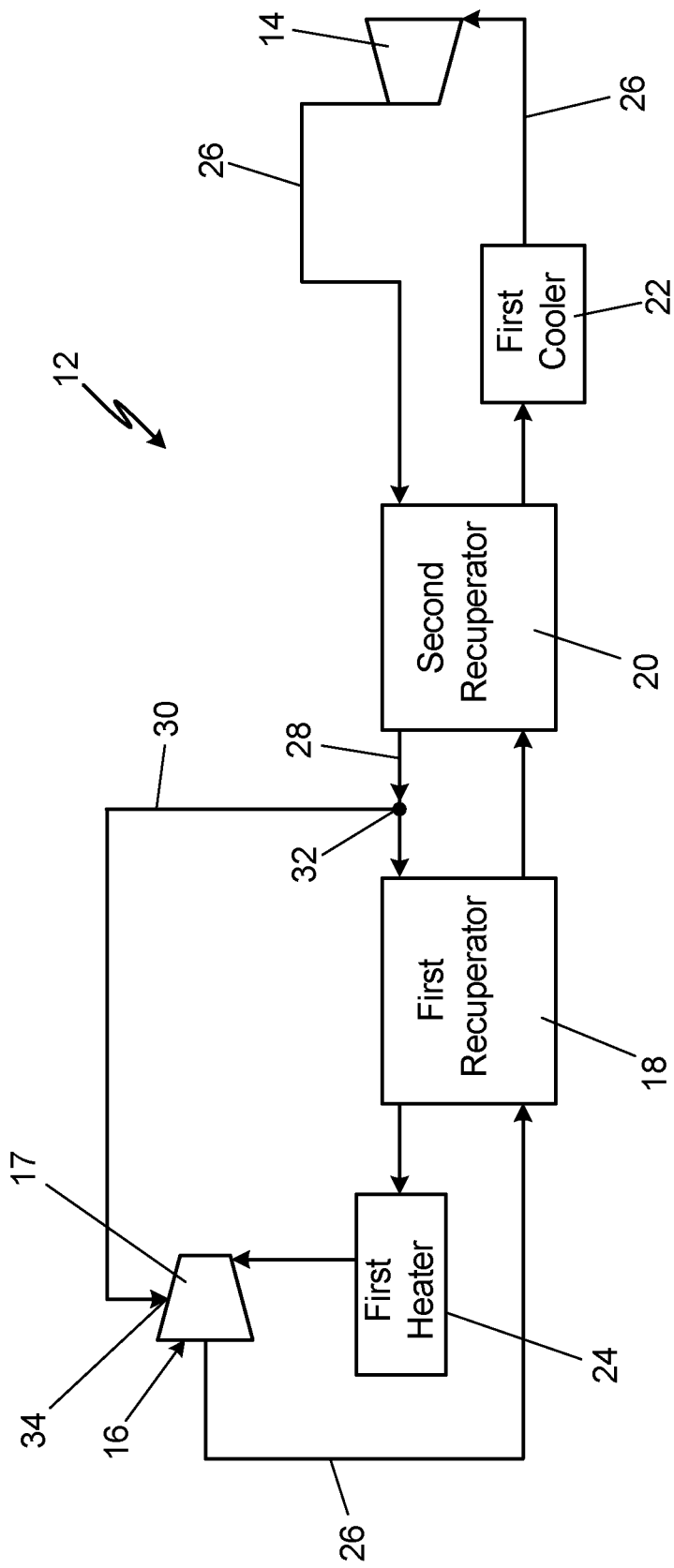
FIG. 2 is a schematic diagram illustrating a first embodiment of a closed-loop Brayton cycle system.

FIG. 2 is a schematic diagram illustrating a first embodiment of closed-loop Brayton cycle system 12 including turbine blade cooling features. Closed-loop Brayton cycle system 12 will hereinafter be referred to as "system 12". System 12 includes first compressor 14, first turbine 16, first recuperator 18, second recuperator 20, first cooler 22, first heater 24, closed-loop flow channel 26, conduit 28, and bleed channel 30. Bleed channel 30 includes bleed inlet 32 and bleed outlet 34. First turbine 16 includes a plurality of turbine blades 17 positioned within first turbine 16, such that the plurality of turbine blades 17 extend circumferentially around an axis of first turbine 16 (not explicitly depicted). The plurality of turbine blades 17 are configured to extract energy from the high temperature, high pressure working fluid flowing through system 12. In some examples, the plurality of turbine blades 17 are constructed from a nickel-chromium-based superalloy material to withstand the high temperatures of the working fluid flowing past the plurality of turbine blades 17 during operation of system 12. Further, each of the plurality of turbine blades 17 include internal cooling features to allow the plurality of turbine blades 17 to withstand the high temperatures of the working fluid flowing past the plurality of turbine blades 17 during operation of system 12. The internal cooling features can be one or more of internal cooling passages, raised internal turbulators or trip strips, and film cooling holes, among other options. For example, the internal cooling features may be analogous to those commonly used for aircraft gas turbine engine turbine blades.

First compressor 14 is a component of system 12 that is fluidly coupled to closed-loop flow channel 26 of system 12. First compressor 14 is configured to receive a working fluid, compress the working fluid to increase the pressure and temperature of the working fluid, and then flow the compressed working fluid into closed-loop flow channel 26. First turbine 16 is a component of system 12 that is fluidly coupled to closed-loop flow channel 26 of system 12. First turbine 16 is configured to receive a high temperature, high pressure working fluid, extract energy from the high temperature, high pressure working fluid, and then flow the working fluid back into closed-loop flow channel 26. First compressor 14 and first turbine 16 are fluidly coupled through closed-loop flow channel 26, such that the working fluid can flow through system 12 from one component to the other.

First recuperator 18 and second recuperator 20 are components of system 12 that are fluidly coupled to closed-loop flow channel 26 of system 12. First recuperator 18 and second recuperator 20 are both positioned between first compressor 14 and first turbine 16. Further, first recuperator 18 and second recuperator 20 are both fluidly coupled to first compressor 14 and first turbine 16 through closed-loop flow channel 26. As such, closed-loop flow channel 26 creates a flow path to each of first turbine 16, first recuperator 18, second recuperator 20, and first compressor 14, allowing the working fluid to continuously recirculate through system 12 during operation of system 12. Further, first recuperator 18 is fluidly coupled through conduit 28 to second recuperator 20, allowing the working fluid to flow from second recuperator 20 through conduit 28 to first recuperator 18.

First recuperator 18 and second recuperator 20 are configured to extract heat from the working fluid after the working fluid exits first turbine 16, and first recuperator 18 and second recuperator 20 are configured to transfer the extracted heat to the working fluid after the working fluid exits first compressor 14. As such, first recuperator 18 and second recuperator 20 are heat exchangers that are configured to transfer heat from one portion of system 12 to another portion of system 12, discussed below. As shown in FIG. 2, first recuperator 18 and second recuperator 20 are positioned in series, such that first recuperator 18 and second recuperator 20 are connected end-to-end through conduit 28 to form a path for the working fluid that is directed to the first heater 24 and first turbine 16 to flow from second recuperator 20 to first recuperator 18. Closed-loop flow channel 26 and conduit 28 can be any fluid tight channel, passage, or conduit that allows the working fluid to flow through system 12.

As shown in FIG. 2, system 12 also includes first cooler 22 and first heater 24. First cooler 22 can be positioned between and fluidly coupled through closed-loop flow channel 26 to both second recuperator 20 and first compressor 14, such that the working fluid flowing out of second recuperator 20 can flow through first cooler 22 before flowing into first compressor 14.

First cooler 22 can be a heat exchanger or any other device capable of reducing the temperature of the working fluid as the working fluid flows through first cooler 22. First heater 24 can be positioned between and fluidly coupled through closed-loop flow channel 26 to both first recuperator 18 and first turbine 16, such that the working fluid flowing out from first recuperator 18 can flow through first heater 24 before flowing into first turbine 16. First heater 24 can be one or more of an external combustor system, combustion chamber, heat exchanger, solar energy device, or any other device capable of increasing the temperature of the working fluid as the working fluid flows through first heater 24. In other examples, system 12 may not include first cooler 22 and/or first heater 24.

System 12 further includes bleed channel 30 including bleed inlet 32 and bleed outlet 34. Bleed channel 30 can be any fluid tight channel, passage, and/or conduit that allows the working fluid to flow through bleed channel 30. Bleed inlet 32 of bleed channel 30 is fluidly coupled to conduit 28 at a location between first recuperator 18 and second recuperator 20. In some examples, bleed inlet 32 can be fluidly coupled to conduit 28 at approximately a mid-point of a length of conduit 28 extending between and fluidly connecting second recuperator 20 to first recuperator 18. Bleed outlet 34 of bleed channel 30 is fluidly coupled to first turbine 16, and more specifically fluidly coupled to each of the plurality of turbine blades 17 of first turbine 16. Bleed channel 30 extends between bleed inlet 32 and bleed outlet 34, providing a flow path between bleed inlet 32 and bleed outlet 34, and therefore a flow path between conduit 28 and first turbine 16. Bleed channel 30 is configured to direct a bleed stream of working fluid from conduit 28, through bleed inlet 32, bleed channel 30, and bleed outlet 34, and into each of the plurality of turbine blades 17 of turbine 16. More specifically, bleed channel 30 is configured to direct the bleed stream of working fluid from conduit 28, through bleed channel 30, and into the internal cooling features of each of the plurality of turbine blades 17 to reduce the temperature of each of the plurality of turbine blades 17 when system 12 is operating, discussed further below.

System 12 is configured to flow the working fluid through system 12 such that the working fluid continuously recirculates through system 12 during operation. In some examples, the working fluid can be a supercritical carbon dioxide ($sCO_2$). Supercritical carbon dioxide is a fluid state of carbon dioxide ($CO_2$), where it is held at or above its critical temperature and critical pressure. Carbon dioxide usually behaves as a gas in air at standard temperature and pressure, or as a solid called dry ice when frozen. If the temperature and pressure are both increased from standard temperature and pressure to be at or above the critical point for carbon dioxide, it can adopt properties midway between a gas and a liquid. At this state, supercritical carbon dioxide can be used efficiently within a closed-loop Brayton cycle system. Further, supercritical carbon dioxide may accommodate a large temperature difference whilst remaining in a supercritical state, facilitating design and coupling of turbomachine components.

Supercritical $CO_2$ in an example Brayton cycle operating at cycle temperatures of interest also undergoes an extreme density change throughout the cycle, becoming very dense immediately before compression and much less dense before expansion. These density changes are advantageous in that power required to compress is reduced and power obtained through expansion is increased. Further, the low density of $CO_2$ just before expansion is still greater than air at a corresponding point in an open-loop air Brayton cycle, enabling the size of most system components, such as turbines, compressors, and recuperators, to be reduced compared to corresponding air-breathing components, leading to a smaller plant footprint and possibly lower capital costs. Supercritical carbon dioxide is also generally considered an ideal working fluid because it is non-explosive, non-flammable, non-toxic, and inexpensive. As such, using supercritical carbon dioxide as the working fluid for system 12 can provide many advantages that can lead to highly efficient power generation systems.

In operation, the working fluid flowing through closed-loop flow channel 26 flows into first compressor 14, where the working fluid is compressed to achieve a higher temperature and higher pressure working fluid. The working fluid flows out first compressor 14, through closed-loop flow channel 26, and into second recuperator 20 where heat is added to the compressed working fluid. As discussed, second recuperator 20 is configured to extract heat from the working fluid after the working fluid exits first turbine 16, and second recuperator 20 is configured to transfer the extracted heat to the working fluid after the working fluid exits first compressor 14. In some examples, second recuperator 20 is configured to heat the working fluid exiting second recuperator 20 to a temperature ranging between 50° C. and 250° C. when system 12 is operating. The working fluid flows out of second recuperator 20 and into conduit 28, which fluidly connects second recuperator 20 to first recuperator 18. It should be noted that in some applications, it is possible to cool the working fluid ($CO_2$) below the critical point before entering into compressor 14. In such cases, the working fluid ($CO_2$) will exist in a liquid or two-phase state for part of the cycle, such as, but not limited to, the flow leg between second recuperator 20 and first cooler 22, and/or the flow leg after first cooler 22 and compressor 14.

A first portion of the working fluid flowing through conduit 28 enters bleed inlet 32 of bleed channel 30, while a second portion of the working fluid flowing through conduit 28 enters first recuperator 18. The first portion of the working fluid enters bleed inlet 32, flows through bleed channel 30 to bleed outlet 34, and then flows through bleed outlet 34 into the internal cooling features of each of the plurality of turbine blades 17 of first turbine 16. The first portion of the working fluid flowing through bleed channel 30 and bleed outlet 34 into the internal cooling features of the plurality of turbine blades 17 is at a temperature ranging between 50° C. and 250°C. when system 12 is operating. As such, the first portion of the working fluid is configured to cool and reduce the temperature of each of the plurality of turbine blades 17 during operation of system 12. More specifically, the first portion of the working fluid flowing into each of the plurality of turbine blades 17 flows through the internal cooling features within an interior of each of the plurality of turbine blades 17, absorbing heat from the each of the plurality of turbine blades 17 to decrease the temperature of each of the plurality of turbine blades 17 during operation of system 12. The first portion of the working fluid then exits and combines with the second portion of the working fluid being expanded within first turbine 16.

The second portion of the working fluid flowing through conduit 28 enters first recuperator 18 where heat is added to the compressed and heated working fluid. As discussed, first recuperator 18 is configured to extract heat from the working fluid after the working fluid exits first turbine 16, and first recuperator 18 is configured to transfer the extracted heat to the working fluid after the working fluid exits second recuperator 20 and enter first recuperator 18. In some examples, first recuperator 18 is configured to heat the working fluid exiting first recuperator 18 to a temperature ranging between 750° C. and 1250° C. when system 12 is operating. The working fluid flows out first recuperator 18, into closed-loop flow channel 26, and then into first heater 24. The working fluid flows through first heater 24, where additional heat is added to the compressed and heated working fluid to further increase the temperature of the working fluid before entering first turbine 16. In some examples, first heater 24 is configured to heat the working fluid to a temperature up to 1500° C. when system 12 is operating. As discussed, the higher the temperature of the working fluid entering first turbine 16 of system 12, the more efficiently system 12 performs.

As seen from the above, the working fluid entering first turbine 16 can be at temperatures up to 1500° C. and the bleed stream entering the internal cooling features of each of the plurality of turbine blades 17 can be at a temperature ranging between 50° C. and 250° C. Therefore, the bleed stream can enter first turbine 16 at a first temperature and the working fluid can enter first turbine 16 at a second temperature, significantly higher than the first temperature. As such, the blead stream is configured to cool each of the plurality of turbine blades 17 by removing heat added to first turbine 16 by the extremely high temperature working fluid flowing through first turbine 16, during operation of system 12. It is to be understood that the temperature ranges described are not to be construed as limiting and describe only certain operating scenarios. The actual temperature ranges during operation of system 12 may vary depending on a multitude of factors.

The heated working fluid flows through and is expanded within first turbine 16, such that power is extracted from the working fluid to be used by a generator or other system. The expanded working fluid continues by flowing through first recuperator 18 and second recuperator 20, where heat is extracted from the working fluid after exiting first turbine 16. At least some of the heat that is extracted from the working fluid is subsequently transferred to the working fluid exiting first compressor 14 and flowing toward first turbine 16, to increase the temperature of the flowing working fluid. The working fluid continuously recirculates through system 12 to produce energy that can be used by an engine or other system. More specifically, the working fluid is continuously heated and cooled during a continuous recirculating cycle to efficiently create power that can be used to drive generators or other systems.

System 12 including a split recuperator (first recuperator 18 and second recuperator 20) and supercritical carbon dioxide as the working fluid allows for high efficiency to be achieved through high turbine input temperatures, as compared to previous fluid power cycles. In some examples, the efficiency of closed-loop Brayton cycle system 12 is equal to or greater than 50%, with the efficiency calculated by dividing the power output (kW) of system 12 by the heat input (kW) supplied to system 12 through the first heater 24. Further, system 12 including bleed channel 30 and internal cooling features within each of the plurality of turbine blades 17, allows a portion of the working fluid to be used to reduce the temperature of each of the plurality of turbine blades 17 during operation of system 12, preventing melting or damage to turbine blades 17 during operation of system 12.

Previous fluid power cycles without bleed channels and turbine blades with internal cooling features are limited in the efficiencies that can be achieved by the material properties of the turbine section. The temperature of the working fluid flowing into the turbine section can only be raised to a maximum temperature limit before the high temperatures of the working fluid will begin melting or damaging the turbine section. System 12 of the present application allows the working fluid to enter first turbine 16 at temperatures above the melting point of the components of first turbine 16, and bleed channel 30 and the internal cooling features reduce the temperature of the components of first turbine 16 to prevent melting or damage to first turbine 16. In turn, the increased temperature of the working fluid entering first turbine 16 results in higher power cycle efficiencies than could previously be achieved. System 12 provides a solution for achieving greater power generation efficiencies to reduce fuel cost and for complying with increasingly strict emissions regulations, among other advantages not specifically described.

Figure 3:
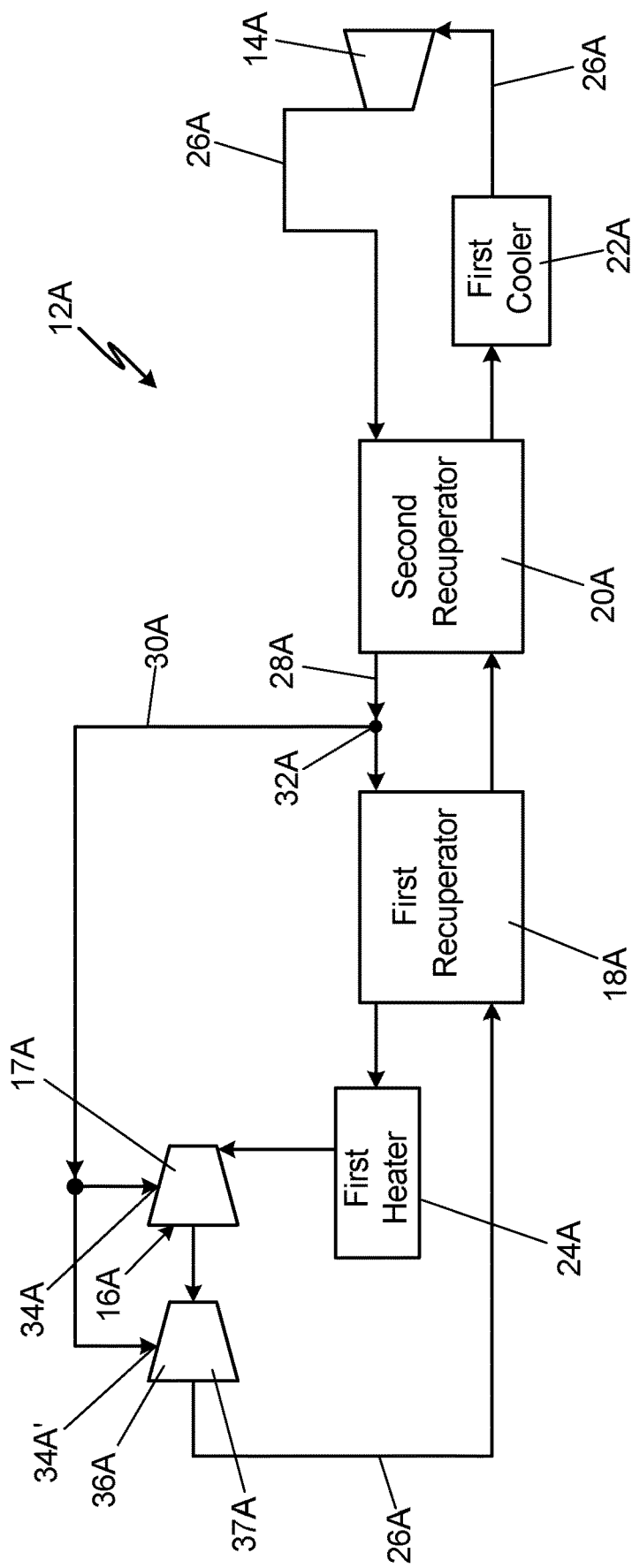
FIG. 3 is a schematic diagram illustrating a second embodiment of a closed-loop Brayton cycle system.

FIG. 3 is a schematic diagram illustrating a second embodiment of closed-loop Brayton cycle system 12A with turbine blade cooling. System 12A shown in FIG. 3 is substantially similar to system 12 of FIG. 2, and therefore only the differences between system 12 and system 12A will be discussed. Further, it is to be understood that the description regarding system 12 shown in FIG. 2 equally applies to system 12A shown in FIG. 3, unless discussed otherwise. System 12A includes first compressor 14A, first turbine 16A, second turbine 36A, first recuperator 18A, second recuperator 20A, first cooler 22A, first heater 24A, closed-loop flow channel 26A, conduit 28A, and bleed channel 30A. Bleed channel 30A includes bleed inlet 32A and bleed outlets 34A and 34A'. The difference between system 12 of FIG. 2 and system 12A of FIG. 3 is that system 12A of FIG. 3 includes the additional components of second turbine 36A and bleed outlet 34A', with an extra section of bleed channel 30A connecting to bleed outlet 34A'. Second turbine 36A is positioned between and fluidly coupled to both first turbine 16A and first recuperator 18A through closed-loop flow channel 26A. Bleed outlet 34A' is fluidly coupled to second turbine 36A, providing a flow path for the cooling bleed stream of the working fluid to flow to second turbine 36A.

In operation, system 12A of FIG. 3 operates the same as system 12 of FIG. 2, except after the expanded working fluid exits first turbine 16A, the working fluid enters and is expanded through second turbine 36A to further extract energy from the working fluid. After the working fluid exits second turbine 36A, system 12A of FIG. 3 operates the same as system 12 of FIG. 2.

In addition, system 12A includes an extra section of bleed channel 30A fluidly coupled to bleed outlet 34A'. Bleed outlet 34A' of bleed channel 30A is fluidly coupled to second turbine 36A, and more specifically fluidly coupled to each of the plurality of turbine blades 37A of second turbine 36A (not explicitly depicted). Bleed channel 30A extends between bleed inlet 32A and bleed outlet 34A', providing a flow path between bleed inlet 32A and bleed outlet 34A', and therefore a flow path between conduit 28A and second turbine 36A. Bleed channel 30A is configured to direct a bleed stream of working fluid from conduit 28A, through bleed inlet 32A, bleed channel 30A, and bleed outlet 34A', and into each of the plurality of turbine blades 37A of second turbine 36A. More specifically, bleed channel 30A is configured to direct the bleed stream of working fluid from conduit 28A, through bleed channel 30A, and into the internal cooling features of each of the plurality of turbine blades 37A to reduce the temperature of each of the plurality of turbine blades 37A of second turbine 36A when system 12A is operating.

As such, system 12A shown in FIG. 3 is another example of a closed-loop Brayton cycle system with turbine blade cooling, to achieve greater efficiencies than could previously be achieved. In this example, bleed channel 30A is fluidly coupled to first turbine 16A and second turbine 36A, and bleed channel 30A is configured to direct the bleed stream of the working fluid flowing through bleed channel 30A into internal cooling features within both first turbine 16A and second turbine 36A when closed-loop Brayton cycle system 12A is operating. System 12A of FIG. 3 provides a solution for achieving greater power generation efficiencies to comply with increasingly strict emissions regulations, among other advantages not specifically described.

Figure 4:
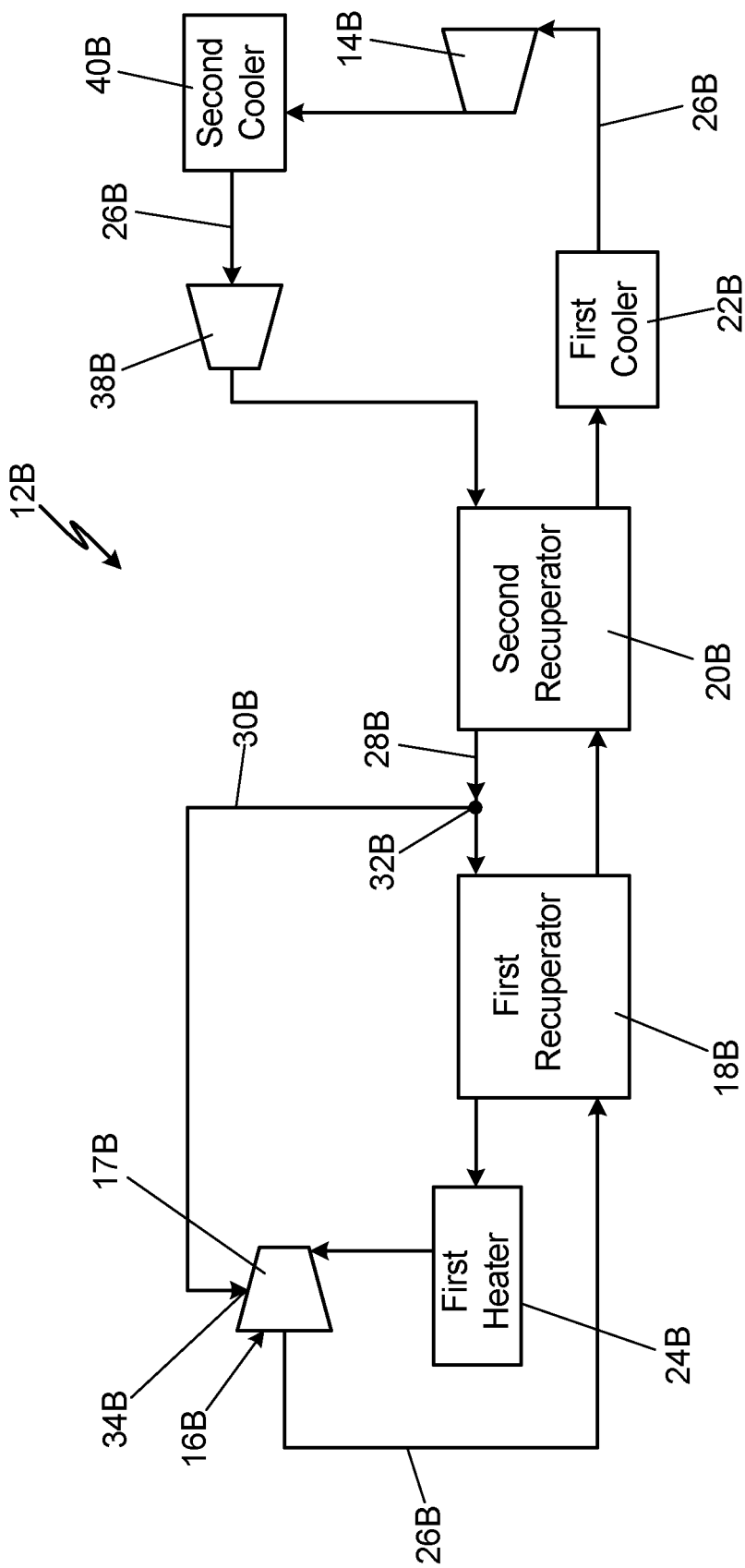
FIG. 4 is a schematic diagram illustrating a third embodiment of a closed-loop Brayton cycle system.

FIG. 4 is a schematic diagram illustrating a third embodiment of closed-loop Brayton cycle system 12B with turbine blade cooling. System 12B shown in FIG. 4 is substantially similar to system 12 of FIG. 2, and therefore only the differences between system 12 and system 12B will be discussed. Further, it is to be understood that the description regarding system 12 shown in FIG. 2 equally applies to system 12B shown in FIG. 4, unless discussed otherwise. System 12B includes first compressor 14B, second compressor 38B, first turbine 16B, first recuperator 18B, second recuperator 20B, first cooler 22B, second cooler 40B, first heater 24B, closed-loop flow channel 26B, conduit 28B, and bleed channel 30B. The difference between system 12 of FIG. 2 and system 12B of FIG. 4 is that system 12B of FIG.

4 includes the additional components of second compressor 38B and second cooler 40B. Second cooler 40B is positioned between and fluidly coupled to both first compressor 14B and second compressor 38B through closed-loop flow channel 26B. Further, second compressor 38B is positioned between and fluidly coupled to both second cooler 40B and second recuperator 20B through closed-loop flow channel 26B.

In operation, system 12B of FIG. 4 operates the same as system 12 of FIG. 2, except after the compressed working fluid exits first compressor 14B, the working fluid enters and is cooled within second cooler 40B to further reduced the temperature of the working fluid. After the working fluid exits second cooler 40B, the cooled working fluid enters second compressor 38B where the working fluid is again compressed to increase the pressure of the working fluid. After, the working fluid exits second compressor 38B, system 12B operates essentially the same as system 12 of FIG. 2, to avoid redundancy the operation will not be discussed again in detail. System 12B shown in FIG. 4 is another example of a closed-loop Brayton cycle system with turbine blade cooling, to achieve greater efficiencies than could previously be achieved. In this example, system 12B includes second cooler 40B, which reduces the temperature of the fluid, thereby reducing the power required to perform compression in compressor 38B. System 12B of FIG. 4 provides a solution for achieving greater power generation efficiencies to comply with increasingly strict emissions regulations, among other advantages not specifically described.

Figure 5:
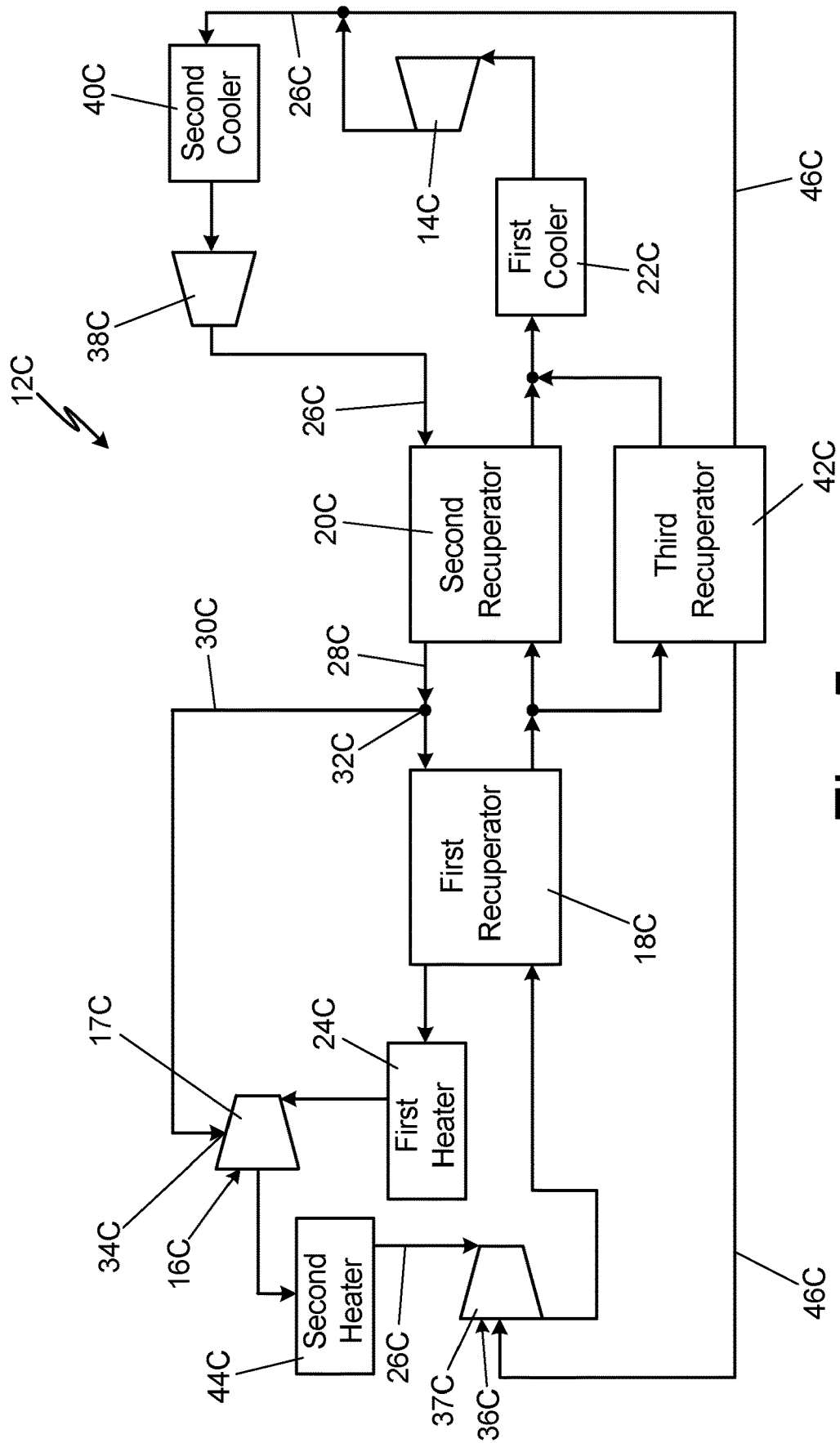
FIG. 5 is a schematic diagram illustrating a fourth embodiment of a closed-loop Brayton cycle system.

FIG. 5 is a schematic diagram illustrating a fourth embodiment of closed-loop Brayton cycle system 12C with turbine blade cooling. System 12C shown in FIG. 5 is similar to system 12 of FIG. 2, and therefore only the differences between system 12 and system 12C will be discussed. Further, it is to be understood that the description regarding system 12 shown in FIG. 2 equally applies to system 12C shown in FIG. 5, unless discussed otherwise. System 12C includes first compressor 14C, second compressor 38C, first turbine 16C, second turbine 36C, first recuperator 18C, second recuperator 20C, third recuperator 42C, first cooler 22C, second cooler 40C, first heater 24C, second heater 44C, closed-loop flow channel 26C, conduit 28C, bleed channel 30C, and cooling channel 46C. The main difference between system 12C of FIG. 5 and system 12 of FIG. 2 is that system 12C of FIG. 5 includes cooling channel 46C and third recuperator 42C, discussed further below.

In operation, the working fluid flowing through closed-loop flow channel 26C flows into and through first cooler 22C, where the temperature of the working fluid is reduced. The cooled working fluid flows into first compressor 14C, where the working fluid is compressed to increase the pressure of the working fluid. The working fluid flows out first compressor 14C, through closed-loop flow channel 26C, and into second cooler 40C where the temperature of the working fluid is further reduced. The cooled working fluid flows into second compressor 38C, where the working fluid is again compressed to further increase the pressure of the working fluid. The working fluid flows out second compressor 38C, through closed-loop flow channel 26C, and into second recuperator 20C where heat is added to the compressed working fluid. The working fluid flows out second recuperator 20C and into conduit 28C, which fluidly connects second recuperator 20C to first recuperator 18C.

A first portion of the working fluid flowing through conduit 28C enters bleed inlet 32C of bleed channel 30C, while a second portion of the working fluid flowing through conduit 28C enters first recuperator 18C. The first portion of the working fluid enters bleed inlet 32C, flows through bleed channel 30C to bleed outlet 34C, and then flows through bleed outlet 34C into the internal cooling features of each of the plurality of turbine blades 17C of first turbine 16C. As discussed regarding system 12 of FIG. 2, the first portion of the working fluid is configured to cool and reduce the temperature of each of the plurality of turbine blades during operation of the system.

The second portion of the working fluid flowing through conduit 28C enters first recuperator 18C where heat is added to the compressed and heated working fluid. The working fluid flows out first recuperator 18C, into closed-loop flow channel 26C, and then into first heater 24C. The working fluid flows through first heater 24C, where additional heat is added to the compressed and heated working fluid to further increase the temperature of the working fluid before entering first turbine 16C. The working fluid flows out first heater 24C and into first turbine 16C where it is expanded, such that power is extracted from the working fluid to drive a generator or other system. The expanded working fluid continues by flowing through second heater 44C, where additional heat is added to the working fluid to further increase the temperature of the working fluid before entering second turbine 36C. The working fluid flows out second heater 44C and into second turbine 36C where it is again expanded, such that further power is extracted from the working fluid to drive a generator or other system. The working fluid continues by flowing through first recuperator 18C and second recuperator 20C, where heat is extracted from the working fluid after exiting second turbine 36C. At least some of the heat that is extracted from the working fluid is subsequently transferred to the working fluid exiting second compressor 38C and flowing toward first turbine 16C, to increase the temperature of the flowing working fluid.

Some of the working fluid that flows through first recuperator 18C is directed to third recuperator 42C, which is positioned in a parallel configuration with second recuperator 20C. Third recuperator 42C is configured to extract heat from the working fluid flowing through third recuperator 42C and transfer the extracted heat to the working fluid flowing through cooling channel 46C. Cooling channel 46C can be any fluid tight channel, passage, or conduit that allows the working fluid to flow from a location downstream of first compressor 14C to second turbine 36C. As such, cooling channel 46C is fluidly coupled to closed-loop cooling channel 46C at a location between first compressor 14C and second cooler 40C. Further, cooling channel 46C extends from closed-loop cooling channel 46C, through third recuperator 42C, and to second turbine 36C.

In operation, a portion of the cooled and compressed working fluid flowing out from first compressor 14C is directed through cooling channel 46C and to third recuperator 42C. Third recuperator 42C transfers heat from the working fluid exiting first recuperator 18C to the working fluid flowing through cooling channel 46C to increase the temperature of the working fluid. The working fluid flows out from third recuperator 42C and into second turbine 36C to cool components of second turbine 36C. More specifically, the working fluid flows into internal cooling features of the plurality of turbine blades 37C within second turbine 36C to remove heat from second turbine 36C. An advantage of directing the working fluid to second turbine 36C directly after exiting first compressor 14C is that the working fluid is at the necessary pressure required to enter into turbine 36C. More specifically, if the working fluid entering second turbine 36C is at too low of a pressure, the working fluid will not be able to flow into second turbine 36C. In contrast, if the working fluid entering second turbine 36C is at too high of a pressure, the power used to achieve this excess pressure is wasted. More specifically, such excess pressure does not appreciably affect the cooling function achieved in the plurality of turbine blades 37C. Further, upon mixing with the main flow 26C into turbine 36C, the pressure in cooling channels 46C will immediately be reduced to the pressure of main flow 26C without bestowing any other advantage to the operation. Therefore, flowing the working fluid into second turbine 36C after it is compressed by first compressor 14C, but before it is compressed by second compressor 38C, results in the working fluid being at an efficient pressure for cooling second turbine 36C.

System 12C shown in FIG. 5 is another example of a closed-loop Brayton cycle system with turbine blade cooling, to achieve greater efficiencies than could previously be achieved. In this example, system 12C includes cooling channel 46C and third recuperator 42C configured to flow the working fluid to second turbine 36C at an efficient cooling pressure, allowing for greater overall efficiency of the system to be achieved. System 12C of FIG. 4 provides another solution for achieving greater power generation efficiencies to comply with increasingly strict emissions regulations, among other advantages not specifically described.

Discussion of Possible Embodiments

The following are non-exclusive descriptions of possible embodiments of the present invention.

A closed-loop Brayton cycle system comprising: a first compressor; a first turbine comprising a plurality of turbine blades, the first turbine fluidly coupled to the first compressor, wherein each of the plurality of turbine blades include internal cooling features; a first recuperator and a second recuperator positioned between the first compressor and the first turbine, wherein the first recuperator and the second recuperator are fluidly coupled to the first compressor and the first turbine, and wherein the first recuperator is fluidly coupled through a conduit to the second recuperator; and a bleed channel comprising a bleed inlet and a bleed outlet, wherein the bleed inlet is fluidly coupled to the conduit at a location between the first recuperator and the second recuperator, and wherein the bleed outlet is fluidly coupled to the plurality of turbine blades to direct a bleed stream of a working fluid flowing through the bleed channel into the internal cooling features of the plurality of turbine blades when the closed-loop Brayton cycle system is operating; wherein the closed-loop Brayton cycle system is configured to flow the working fluid through the closed-loop Brayton cycle system when in operation.

The closed-loop Brayton cycle system of the preceding paragraph can optionally include, additionally and/or alternatively, any one or more of the following features, configurations and/or additional components:

The working fluid is a supercritical carbon dioxide ($CO_2$).

The first recuperator and the second recuperator are positioned in series, such that the first recuperator and the second recuperator are connected end-to-end, forming a path for the working fluid to flow.

The first recuperator and the second recuperator are configured to extract heat from the working fluid after the working fluid exits the first turbine; and the first recuperator and the second recuperator are configured to transfer the extracted heat to the working fluid after the working fluid exits the first compressor.

The second recuperator is configured to heat the working fluid exiting the first compressor prior to entering the bleed inlet of the bleed channel to a temperature ranging between 50° C. and 250° C. when the closed-loop Brayton cycle system is operating; the bleed channel and bleed outlet are configured to flow the working fluid into the internal cooling features of the plurality of turbine blades at a temperature ranging between 50° C. and 250° C. when the closed-loop Brayton cycle system is operating; and the first recuperator is configured to heat the working fluid exiting the second recuperator prior to entering the first turbine to a temperature ranging between 750° C. and 1250° C. when the closed-loop Brayton cycle system is operating.

The conduit is configured to flow a first portion of the working fluid exiting the second recuperator into the bleed inlet of the bleed channel and a second portion of the working fluid exiting the second recuperator through the first recuperator and into the first turbine when the closed-loop Brayton cycle system is operating.

The bleed channel is configured to flow the first portion of the working fluid through the bleed channel to the bleed outlet; and the bleed outlet is configured to flow the first portion of the working fluid through the bleed outlet and into the internal cooling features of the plurality of turbine blades when the closed-loop Brayton cycle system is operating.

The first portion of the working fluid flowing into the plurality of turbine blades flows through the internal cooling features within an interior of each of the plurality of turbine blades, absorbing heat from the each of the plurality of turbine blades to decrease the temperature of each of the plurality of turbine blades.

The closed-loop Brayton cycle system is configured to flow the working fluid through a closed-loop system when the closed-loop Brayton cycle system is operating, such that the working fluid continuously recirculates through the closed-loop system during operation of the closed-loop Brayton cycle system.

A first heater and a first cooler, wherein the first heater is positioned between and fluidly coupled to the first recuperator and the first turbine, and wherein the first cooler is positioned between and fluidly coupled to the second recuperator and the first compressor.

A third recuperator, wherein the second recuperator and the third recuperator are positioned in a parallel configuration.

The bleed channel is fluidly coupled to the first turbine and a second turbine, and wherein the bleed channel is configured to direct the bleed stream of the working fluid flowing through the bleed channel into internal cooling features within both the first turbine and the second turbine when the closed-loop Brayton cycle system is operating.

The following are further non-exclusive descriptions of possible embodiments of the present invention.

A method of operating a closed-loop Brayton cycle system, the method comprising: flowing a working fluid from a first compressor to and through a second recuperator; flowing the working fluid from the second recuperator into a conduit positioned between and fluidly coupling the second recuperator to a first recuperator; directing a first portion of the working fluid through a bleed inlet of a bleed channel and into the bleed channel; directing a second portion of the working fluid through the first recuperator and into a first turbine; and flowing the first portion of the working fluid through the bleed channel and out through a bleed outlet fluidly coupled to a plurality of turbine blades positioned within the first turbine; wherein the first portion of the working fluid flowing into the plurality of turbine blades decreases the temperature of the plurality of turbine blades during operation of the closed-loop Brayton cycle system.

The method of the preceding paragraph can optionally include, additionally and/or alternatively, any one or more of the following features, configurations and/or additional components:

The first recuperator and the second recuperator are positioned in series, such that the first recuperator and the second recuperator are connected end-to-end, forming a path for the working fluid to flow.

Extracting heat, by the first recuperator and the second recuperator, from the working fluid after the working fluid flows through the first turbine; and transferring the extracted heat, by the first recuperator and the second recuperator, to the working fluid after the working fluid flows through the first compressor.

The working fluid is a supercritical carbon dioxide (CO2).

Flowing the first portion of the working fluid into an internal cooling passage positioned within an interior of each of the plurality of turbine blades; and absorbing heat from the interior of each of the plurality of the turbine blades to decrease the temperature of each of the plurality of turbine blades.

Flowing the working fluid through a closed-loop system, such that the working fluid continuously recirculates through the closed-loop system during operation of the closed-loop Brayton cycle system.

The working fluid flowing through the second recuperator and entering the bleed inlet of the bleed channel ranges in temperature between 50° C. and 250° C.; the working fluid flowing through the bleed outlet of the bleed channel into the plurality of turbine blades ranges in temperature between 50° C. and 250° C.; and the working fluid flowing through the first recuperator and entering the first turbine ranges in temperature between 750° C. and 1250° C.

Extracting, by the first turbine, power from the working fluid as the working fluid flows past the first turbine, wherein the amount of power extracted by the first turbine exceeds the amount of power consumed by the first compressor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A closed-loop Brayton cycle system comprising:
a first compressor;
a first turbine comprising a plurality of turbine blades, the first turbine fluidly coupled to the first compressor, wherein each of the plurality of turbine blades include internal cooling features;
a first recuperator and a second recuperator positioned between the first compressor and the first turbine, wherein the first recuperator and the second recuperator are fluidly coupled to the first compressor and the first turbine, and wherein the first recuperator is fluidly coupled through a conduit to the second recuperator; and
a bleed channel comprising a bleed inlet and a bleed outlet, wherein the bleed inlet is fluidly coupled to the conduit at a location between the first recuperator and the second recuperator, and wherein the bleed outlet is fluidly coupled to the plurality of turbine blades to direct a bleed stream of a working fluid flowing through the bleed channel into the internal cooling features of the plurality of turbine blades when the closed-loop Brayton cycle system is operating;
wherein the closed-loop Brayton cycle system is configured to flow the working fluid through the closed-loop Brayton cycle system when in operation.

2. The closed-loop Brayton cycle system of claim 1, wherein the working fluid is a supercritical carbon dioxide ($CO_2$).

3. The closed-loop Brayton cycle system of claim 1, wherein the first recuperator and the second recuperator are positioned in series, such that the first recuperator and the second recuperator are connected end-to-end, forming a path for the working fluid to flow.

4. The closed-loop Brayton cycle system of claim 1, wherein:
the first recuperator and the second recuperator are configured to extract heat from the working fluid after the working fluid exits the first turbine; and
the first recuperator and the second recuperator are configured to transfer the extracted heat to the working fluid after the working fluid exits the first compressor.

5. The closed-loop Brayton cycle system of claim 1, wherein:
the second recuperator is configured to heat the working fluid exiting the first compressor prior to entering the bleed inlet of the bleed channel to a temperature ranging between 50° C. and 250° C. when the closed-loop Brayton cycle system is operating;
the bleed channel and bleed outlet are configured to flow the working fluid into the internal cooling features of the plurality of turbine blades at a temperature ranging between 50° C. and 250° C. when the closed-loop Brayton cycle system is operating; and
the first recuperator is configured to heat the working fluid exiting the second recuperator prior to entering the first turbine to a temperature ranging between 750° C. and 1250° C. when the closed-loop Brayton cycle system is operating.

6. The closed-loop Brayton cycle system of claim 1, wherein the conduit is configured to flow a first portion of the working fluid exiting the second recuperator into the bleed inlet of the bleed channel and a second portion of the working fluid exiting the second recuperator through the first recuperator and into the first turbine when the closed-loop Brayton cycle system is operating.

7. The closed-loop Brayton cycle system of claim 6, wherein:
the bleed channel is configured to flow the first portion of the working fluid through the bleed channel to the bleed outlet; and
the bleed outlet is configured to flow the first portion of the working fluid through the bleed outlet and into the internal cooling features of the plurality of turbine blades when the closed-loop Brayton cycle system is operating.

8. The closed-loop Brayton cycle system of claim 7, wherein the first portion of the working fluid flowing into the plurality of turbine blades flows through the internal cooling features within an interior of each of the plurality of turbine blades, absorbing heat from the each of the plurality of turbine blades to decrease the temperature of each of the plurality of turbine blades.

9. The closed-loop Brayton cycle system of claim 1, wherein the closed-loop Brayton cycle system is configured to flow the working fluid through a closed-loop system when the closed-loop Brayton cycle system is operating, such that the working fluid continuously recirculates through the closed-loop system during operation of the closed-loop Brayton cycle system.

10. The closed-loop Brayton cycle system of claim 1, and further comprising a first heater and a first cooler, wherein the first heater is positioned between and fluidly coupled to the first recuperator and the first turbine, and wherein the first cooler is positioned between and fluidly coupled to the second recuperator and the first compressor.

11. The closed-loop Brayton cycle system of claim 1, and further comprising a third recuperator, wherein the second recuperator and the third recuperator are positioned in a parallel configuration.

12. The closed-loop Brayton cycle system of claim 1, wherein the bleed channel is fluidly coupled to the first turbine and a second turbine, and wherein the bleed channel is configured to direct the bleed stream of the working fluid flowing through the bleed channel into internal cooling features within both the first turbine and the second turbine when the closed-loop Brayton cycle system is operating.

13. A method of operating a closed-loop Brayton cycle system, the method comprising:
flowing a working fluid from a first compressor to and through a second recuperator;
flowing the working fluid from the second recuperator into a conduit positioned between and fluidly coupling the second recuperator to a first recuperator;
directing a first portion of the working fluid through a bleed inlet of a bleed channel and into the bleed channel;
directing a second portion of the working fluid through the first recuperator and into a first turbine; and
flowing the first portion of the working fluid through the bleed channel and out through a bleed outlet fluidly coupled to a plurality of turbine blades positioned within the first turbine;
wherein the first portion of the working fluid flowing into the plurality of turbine blades decreases the temperature of the plurality of turbine blades during operation of the closed-loop Brayton cycle system.

14. The method of claim 13, wherein the first recuperator and the second recuperator are positioned in series, such that the first recuperator and the second recuperator are connected end-to-end, forming a path for the working fluid to flow.

15. The method of claim 13, and further comprising:
extracting heat, by the first recuperator and the second recuperator, from the working fluid after the working fluid flows through the first turbine; and
transferring the extracted heat, by the first recuperator and the second recuperator, to the working fluid after the working fluid flows through the first compressor.

16. The method of claim 13, wherein the working fluid is a supercritical carbon dioxide (CO2).

17. The method of claim 13, and further comprising:
flowing the first portion of the working fluid into an internal cooling passage positioned within an interior of each of the plurality of turbine blades; and
absorbing heat from the interior of each of the plurality of the turbine blades to decrease the temperature of each of the plurality of turbine blades.

18. The method of claim 13, and further comprising flowing the working fluid through a closed-loop system, such that the working fluid continuously recirculates through the closed-loop system during operation of the closed-loop Brayton cycle system.

19. The method of claim 13, wherein
the working fluid flowing through the second recuperator and entering the bleed inlet of the bleed channel ranges in temperature between 50° C. and 250° C.;
the working fluid flowing through the bleed outlet of the bleed channel into the plurality of turbine blades ranges in temperature between 50° C. and 250° C.; and
the working fluid flowing through the first recuperator and entering the first turbine ranges in temperature between 750° C. and 1250° C.

20. The method of claim 13, and further comprising extracting, by the first turbine, power from the working fluid as the working fluid flows past the first turbine, wherein the amount of power extracted by the first turbine exceeds the amount of power consumed by the first compressor.

\* \* \* \* \*